(12) United States Patent
Xue et al.

(10) Patent No.: US 12,547,037 B2
(45) Date of Patent: Feb. 10, 2026

(54) LIQUID CRYSTAL LIGHT MODULATING DEVICE

(71) Applicant: SMART LIQUID CRYSTAL TECHNOLOGIES CO., LTD., Jiangsu (CN)

(72) Inventors: Jiuzhi Xue, Suzhou (CN); Li Li, Suzhou (CN); Fei Wang, Suzhou (CN); Jianhua Tang, Suzhou (CN); Ximei Shen, Suzhou (CN)

(73) Assignee: SMART LIQUID CRYSTAL TECHNOLOGIES CO., LTD., Suzhou (CN)

( * ) Notice: Subject to any disclaimer, the term of this patent is extended or adjusted under 35 U.S.C. 154(b) by 0 days.

(21) Appl. No.: 18/703,261

(22) PCT Filed: Sep. 20, 2022

(86) PCT No.: PCT/CN2022/119916
§ 371 (c)(1),
(2) Date: Apr. 19, 2024

(87) PCT Pub. No.: WO2023/065925
PCT Pub. Date: Apr. 27, 2023

(65) Prior Publication Data
US 2025/0244629 A1    Jul. 31, 2025

(30) Foreign Application Priority Data
Oct. 22, 2021  (CN) .................. 202111232990.8

(51) Int. Cl.
*G02F 1/137* (2006.01)
*C09K 19/52* (2006.01)
(Continued)

(52) U.S. Cl.
CPC .......... *G02F 1/13718* (2013.01); *C09K 19/52* (2013.01); *G02F 1/13306* (2013.01); *G02F 1/13398* (2021.01); *G02F 2202/28* (2013.01)

(58) Field of Classification Search
CPC ............. G02F 1/13718; G02F 1/13398; G02F 1/13306; G02F 2202/28; C09K 19/52
See application file for complete search history.

(56) References Cited

U.S. PATENT DOCUMENTS

2015/0378205 A1   12/2015   Kim et al.
2016/0018681 A1   1/2016    Chien et al.
(Continued)

FOREIGN PATENT DOCUMENTS

CN   101059607 A   10/2007
CN   102460238 A   5/2012
(Continued)

OTHER PUBLICATIONS

Yu et al., "Simultaneous control of haze and transmittance using a dye-doped cholesteric liquid crystal cell," Liquid Crystals, vol. 42, No. 10, 2015, pp. 1460-1464.
(Continued)

*Primary Examiner* — Anne M Hines
(74) *Attorney, Agent, or Firm* — Birch, Stewart, Kolasch & Birch, LLP (57) ABSTRACT

A liquid crystal light modulating device includes substrates coated with a transparent conductive layer and a liquid crystal composition sandwiched between the substrates with a dichroic dye added; the resulting liquid crystal light modulating device can exist in at least two stable states that remain substantially stable after removal of a voltage. At least one of them is the liquid crystal molecules arranged in a substantially ordered manner, and at least one of them is the liquid crystal molecules arranged in a multi-domain and
(Continued)

disordered manner; the applied voltage makes the arrangement of liquid crystal molecules can be quickly switched between the above stable states, and different liquid crystal molecule arrangements from the stable states can be obtained.

17 Claims, 5 Drawing Sheets

(51) Int. Cl.
*G02F 1/133* (2006.01)
*G02F 1/1339* (2006.01)

(56) References Cited

U.S. PATENT DOCUMENTS

| | | | |
|---|---|---|---|
| 2017/0343847 A1* | 11/2017 | Fiebranz | G02F 1/1393 |
| 2017/0357131 A1* | 12/2017 | Chen | C09K 19/2028 |
| 2017/0369780 A1* | 12/2017 | Adlem | C09K 19/14 |
| 2018/0051210 A1* | 2/2018 | Sawada | C09K 19/54 |
| 2018/0373084 A1 | 12/2018 | Lim et al. | |
| 2023/0152649 A1* | 5/2023 | Mondiot | G02F 1/13775 349/35 |
| 2024/0318081 A1 | 9/2024 | Shen et al. | |

FOREIGN PATENT DOCUMENTS

| | | |
|---|---|---|
| CN | 105229117 A | 1/2016 |
| CN | 105278197 A | 1/2016 |
| CN | 106433186 A | 2/2017 |
| CN | 108138048 A | 6/2018 |
| CN | 109825309 A | 5/2019 |
| CN | 110320687 A | 10/2019 |
| CN | 110794609 A | 2/2020 |
| CN | 111505857 A | 8/2020 |
| CN | 211293542 U | 8/2020 |
| CN | 111694197 A | 9/2020 |
| CN | 211718672 U | 10/2020 |
| CN | 111983867 A | 11/2020 |
| CN | 112130362 A | 12/2020 |
| CN | 113185985 A | 7/2021 |
| JP | 3-51417 U | 5/1991 |
| JP | 2017-200856 A | 11/2017 |
| JP | 2018-508840 A | 3/2018 |
| JP | 2020-512252 A | 4/2020 |
| KR | 10-2016-0118505 A | 10/2016 |
| KR | 10-2020-0093633 A | 8/2020 |
| KR | 10-2021-0019511 A | 2/2021 |
| KR | 10-2021-0102366 A | 8/2021 |

OTHER PUBLICATIONS

International Search Report for PCT/CN2022/119916 mailed on Nov. 10, 2022.

* cited by examiner

LIQUID CRYSTAL LIGHT MODULATING DEVICE

CROSS-REFERENCE TO RELATED APPLICATION

This application claims the benefit of the China Patent Application No. CN202111232990.8 filed on Oct. 22, 2021, titled "A Liquid Crystal Light Modulating device", and the contents of this application are incorporated herein by reference in their entirety.

FIELD OF INVENTION

The present invention generally relates to the liquid crystal electro-optical device, and more particularly, to a light modulating device which simultaneously realizes privacy protection, and large dynamic modulation range over a broad spectrum range of incident light.

BACKGROUND

Glass, glass windows and doors are one of the first technologies to be invented and commercialized in modern times, and the use of glass on a large scale has made it possible to view the outdoors clearly and capture sunlight despite the physical separation of the indoors and the outdoors. However, the use of glass walls, windows and doors brings the disadvantages of loss of privacy and increased energy consumption.

Traditional solutions to privacy and partial solutions to increased energy consumption include mechanical devices such as curtains and blinds. Other solutions to increased energy consumption in recent years include insulating glass units, Low-E coatings and other product technologies. In recent decades, a lot of research has been done on the so-called light modulating glass, which can directly modulate the propagation of light, and its product technology is becoming more and more mature. The light modulating glass or smart glass is increasingly used in buildings and vehicular applications.

There exist three main classes of light modulating technologies: electrochromic, suspended particle devices, and liquid crystal light modulating technology. Electrochromic (EC) devices have excellent mechanical properties as they are solid state devices, but for products with sizes typical to glass doors and windows, the switching time from the transparent to dark state is at least a few minutes and in fact can be on the order of an hour. The EC devices further leak enough light in the dark states where there is no privacy protection for building occupants in evenings when the external ambient light is darker. and the stringent device uniformity and purity requirements result in low product yield and short product life. Similar to electrochromic glass, suspended particle devices (SPD) do not have a privacy protection state, although a SPD device is in a light blocking state when the power is off which does not satisfy the need to turn into a transparent state when the power is off. In addition, there are only a few companies to develop SPD modulating technology, resulting in high production costs and slow advancement of industrialization of the technology.

Liquid crystal light modulating technology has developed significantly because of the extremely successful commercialization of flat panel display technology. Conventional polymer dispersed liquid crystals (PDLC) have excellent privacy protection properties, and their products are widely used for interior decorations, as interior partitions, etc. However, PDLC technology failed so far to penetrate the market involving exterior glass doors, windows, and glass walls, primarily due to haze and therefore the lack of clarity in the transparent state, and further the devices have almost no solar radiation energy control. In recent years, the new light modulating technology, bistable liquid crystal light modulating devices have been greatly improved compared to PDLC technology, making it possible to be used for exterior wall glass. However, like PDLC technology, bistable liquid crystal light modulating glass has minimal dynamic control of solar energy.

Another well-known liquid crystal light modulating device technology is the dichroic dye doped or commonly known as guest host liquid crystal technology, where in general a single dye doped liquid crystal device modulate only for a kind of polarized light, resulting in the need of two such devices to control the transmittance of natural light. As a result, compared to the EC and SPD technologies, dynamic modulation range and therefore the control of solar radiation energy of a single dye doped liquid crystal device is narrower, and the cost is even higher for a dye doped device system to modulate the natural solar radiation energy. At the same time, like EC, SPD light modulating technology, conventional dye doped liquid crystal light modulating glass does not have a privacy protection state that is desirable for building or vehicular occupants particularly in evenings. To achieve the function of light modulation and privacy protection, it is disclosed in the published patents that the dimming device can be combined with a haze controlling device, and connect to external driver connector, but the process of the double-cells device is complex and the cost can be high.

Therefore, it is desirable to have a single light modulating device where the device can realize both privacy protection and dynamic modulation of light, and further having highly clear transparent and tinted states in all viewing directions, and the device can be switched between the states rapidly. For successful commercial applications of the device technology, it is also highly desirable that the devices can be manufactured cost effectively.

SUMMARY OF INVENTIONS

The present invention provides a new type of liquid crystal light modulating device, which can satisfy the requirement by the combination of liquid crystal material, device structure and driving mode.

In order to realize the above purpose, the present invention provides a liquid crystal light modulating device, the core of which is a liquid crystal layer comprising liquid crystal material and dichroic dyes whose molecular arrangement is in a direction substantially the same as that of the surrounding liquid crystal molecules. The liquid crystal molecules and the dichroic dye molecular arrangement having a plurality of molecular arrangements in the presence of the elasticity, the surface force and the applied voltage, including an arrangement with a substantially uniform direction under the applied voltage, at least one arrangement with an orderly aligned state and another with highly disordered, multi-domain molecular arrangement that remains stable in the absence of the applied voltage. When incident light passes through the liquid crystal layer having a substantially aligned arrangement of molecules, the incident light passes through substantially without scattering, and when incident light passes through the liquid crystal layer having multi-domain arrangement of molecules, the incident light passes through the liquid crystal layer with increased scattering and absorption.

Embodiments of the present invention and the purposes thereof are described and illustrated below by way of examples and in conjunction with systems, tools and methods. These examples are exemplary and illustrative only, and not limiting. In various embodiments, one or more of the above market needs have been met by the present invention, while other embodiments are directed to other improvements.

The main objective of the present invention is to provide a liquid crystal light modulating device which has at least two states which remain stable after removal of an applied voltage, wherein at least one of the states has liquid crystal molecules arranged in a basically ordered manner, and incident light incident thereon passes through basically unscattered or with a small amount of scattering; and wherein at least one of the states has liquid crystal molecules arranged in a disordered manner with multi-domains, and incident light incident thereon passes through after being absorbed and scattered in large quantities.

Another objective of the invention is to provide a liquid crystal light modulating device, wherein in addition to at least two states that are stable after the removal of the applied voltage, the liquid crystal molecules are basically orderly arranged when an external voltage is applied, and light incident on the liquid crystal light modulating device passes through with minimal absorption and basically no scattering.

Another objective of the present invention is to provide a liquid crystal light modulating device in which at least two states, including at least one molecular arrangement which is basically ordered and at least one molecular arrangement which is multi-domain disordered, have basically consistent modulating effects on mutually perpendicular linearly polarized light incident on it.

Another objective of the present invention is to provide a liquid crystal light modulating device in which the color of the at least two stable states can be predetermined.

Another objective of the present invention is to provide a liquid crystal light modulating device in which near-infrared light incident on the at least two stable states device can be controlled.

Another objective of the present invention is to provide a liquid crystal light modulating device whose at least two stable states and transmission states under applied voltage can be partitioned and independently controlled.

Another objective of the present invention is to provide a driving method to realize the functions demonstrated by the liquid crystal light modulating device provided in the present invention.

Another objective of the invention is to provide a lamination method by which the liquid crystal light modulating device provided in the present invention can be strengthened so that it can be widely used in the building field.

The further objective of the present invention is to provide a glass window that blocks the exchange of heat energy due to conduction and convection, and at the same time allows the operator to control the transparency of the glass window, the transmittance of solar radiant energy, and the privacy protection of the glass window.

According to the purposes of the present invention, the invention provides a liquid crystal light modulating device comprising: a first transparent conductive substrate; a second transparent conductive substrate; and a liquid crystal layer between the first and second transparent conductive substrates, wherein the first transparent conductive substrate comprises a first transparent substrate and a first transparent conductive layer positioned adjacent to the liquid crystal layer, and the second transparent conductive substrate comprises a second transparent substrate and a second transparent conductive layer adjacent to the liquid crystal layer. The liquid crystal layer comprises a liquid crystal composition and dichroic dyes, the liquid crystal composition includes a nematic liquid crystal composition, chiral compounds and bi-mesogenic compounds. The arrangement of liquid crystal molecules and corresponding dichroic dye molecules in the liquid crystal layer is varied depending on the voltage applied between the first conductive substrate and second conductive substrate, and the change in the arrangement of liquid crystal molecules and dichroic dye molecules in the liquid crystal layer results in the charge in the propagation characteristics, including transmission, scattering, absorption, reflection, etc., of light incident on said liquid crystal layer. The arrangement of liquid crystal molecules has at least two stable states which remain substantially stable in the absence of an applied voltage, at least one stable state among the states is transparent state that is transmissive for light incident on the liquid crystal layer, at least one stable state among the states is an opaque state that is capable of both absorbing and scattering light incident on the liquid crystal layer.

Further, the nematic liquid crystal composition includes a nematic liquid crystal compound or liquid crystal mixture, and the nematic liquid crystal composition is in an amount from 30% wt to 90% of the liquid crystal composition.

Further, the chiral compound is chiral liquid crystal, and the chiral compound is in an amount from 0.01% wt to 30% wt of the liquid crystal composition.

Further, the bimesogenic compound is a liquid crystal compound with two bimesogenic units, which is a compound of formula I:

Wherein
R1 and R2 are each independently H, F, Cl, or a alkyl group with 1 to 25 C atoms wherein one and more hydrogen atoms may be independently substituted by halogen and one or more non-adjacent —CH2- groups may be independently substituted by —O—, —CH=CH—, —CH=CF—, or —CF=CF—, MG1 and MG2 are each independently a mesogenic group, X is a straight-chain or branched alkyl group with 3 to 40 C atoms wherein one or more non-adjacent —CH2- groups may be independently substituted by —O—, —CH(F)—, —CH(Cl)—, —CH=CH—, however in such a way that no two O-atoms are adjacent to one another, no two double bonds (—CH=CH—) are adjacent to each other;

and wherein the bimesogenic compound is in an amount from 10% to 50% by weight based on the liquid crystal composition.

Further, the dichroic dyes may be dissolved in the liquid crystal composition, form a partial order arrangement with an order parameter between 0.1 to 1 to follow the liquid crystal molecules, and the dichroic dyes are in an amount from 0.01% wt to 5% wt of the liquid crystal composition.

Further, the dichroic dyes have single component, and an absorption peak in any waveband between 300 nm and 2500 nm.

Further, the dichroic dye is a mixture consisting of a plurality of components, absorption peak of each component is in any waveband between 300 nm and 2500 nm and these absorption peaks of each component may or may not overlap.

Further, each of the first and second transparent substrates is a flat glass sheet, tempered glass sheet, semi-tempered glass sheet, half-tempered glass sheet, float glass sheet, or plastic substrate film.

Further, the plastic substrate film is selected from at least one of PET film, PI film, PTFE film, PP film, PC film, PVC film, PE film, PS film, PA film, PEN film, PMMA film, and PBT film.

Further, the material of the first and second transparent conductive layer is any one of a metal oxide film, metallic nanowire-based conductive film, metallic mesh, and carbon-based conductive film.

Further, at least one of the first and second transparent conductive layer comprises at least one of independently electrically addressable region.

Further, the liquid crystal light modulating device further comprises a first and/or second alignment layers on one side of the first and/or second transparent conductive substrates adjacent to the liquid crystal layer.

Further, a material of the first and/or second alignment layers is any one of polyimide, polyvinyl alcohol, polyester, epoxy resin, polyurethane, polysilane, polystyrene and derivatives thereof.

Further, an alignment method of the first and/or second alignment layers is any one of rubbing alignment, photoalignment, obliquely evaporated oxides, or Langmuir-Blodgett film alignment.

Further, an alignment mode of the first and/or second alignment layers is any one of IPS, TN, STN, or VA.

Further, the method to applied the first alignment layer and/or second alignment layer is any one of the spin coating, dip coating, flexographic printing, spray painting, or slot-die coating.

Further, the liquid crystal light modulating device further comprises spacers positioned between the first and second transparent conductive substrates, wherein the spacer material is selected from at least one of photo-spacers by way of etching of photo-sensitive resins, glass fiber, and inorganic material, and the shape of the spacer material comprises ball, rod-like, or a mixture of the above.

Further, the thickness of the liquid crystal layer is 1-60 μm.

Further, the thickness of the liquid crystal layer is 5-50 μm.

Further, the liquid crystal light modulating device may realize at least three states including a transparent state with low haze, a tinted state with low haze, and a high scattering state that absorbs light as well, for visible light and near-infrared light incident thereon.

Further, the high clarity transparent and low haze state is obtained by continuously applying a first voltage between the first transparent conductive layer and the second transparent conductive layer, in which the liquid crystal molecules in the liquid crystal layer are aligned roughly perpendicular to the first transparent conductive layer and second transparent conductive layer. The tinted and low haze state is obtained by applying a second voltage between the first transparent conductive layer and the second transparent conductive layer, in which the liquid crystal molecules in the liquid crystal layer are arranged roughly parallel to the first transparent conductive layer and second transparent conductive layer and have a certain helical structure arrangement. The high scattering state is obtained by applying a third voltage between the first transparent conductive layer and the second transparent conductive layer, in which the liquid crystal molecules in the liquid crystal layer of the light modulating device present a random arrangement of focal conic state.

Further, the first voltage is a continuous voltage, the second and third voltages are pulse voltages.

Further, the first voltage is an alternating current voltage with a magnitude of 10-500V and a frequency of 20-10000 Hz.

Further, the second voltage is an alternating pulse voltage comprising one continuous pulse or a plurality of different or same pulses, the alternating pulse voltage have a magnitude of 10-300V, a frequency of 20-10000 Hz, and a pulse width of 0.01-300 s.

Further, the third voltage is alternating pulse voltage comprising one continuous pulse or a plurality of different or same pulses, the alternating pulse voltage have a magnitude of 10-300V, a frequency of 20-10000 Hz, and a pulse width of 0.01-300 s.

Further, the continuous voltage comprises a gradient voltage combined with pulse voltage.

Further, the pulse voltage of first voltage is different from the pulse voltages of second and third voltage in magnitude, frequency, and pulse width.

Further, the transmittance is not less than 30% and the haze is not higher than 5% in the transparent state with low haze, the transmittance is not higher than 50% and the haze is not higher than 10% in the tinted state with low haze, and the transmittance is not higher than 40% and the haze is not less than 60% in the light absorbing and scattering state with high haze.

Further, the transmittance of the transparent, low haze state and tinted, low haze state can be adjusted according to the composition and concentration of the added dichroic dyes, and the ratio of the transmittance of the transparent, low haze state to the transmittance of said tinted, low haze state to the transmittance of a particular wavelength or range of wavelengths of incident light can be greater than 2:1.

In order to realize the above objectives, the present invention also provides a laminated liquid crystal light modulating device obtained using the above liquid crystal light modulating device comprising a first substrate, a first adhesive layer, a liquid crystal light modulating device, a second adhesive layer, and a second substrate, laminated in sequence.

Further, the first and second adhesive layer are polymerizable or thermo-plastic polymer layers with adhesive property, the polymer compound layers are selected from any one or more of PVB, EVA, and SPU.

Further, the first and second substrates are made of same or different materials.

Further, the materials of the first and second substrate are selected from one or more of glass, tempered glass sheet, Low-E glass, special glass having the ability to block electromagnetic radiation, and plastic substrate.

In order to realize the above objectives, the present invention also provides a laminated liquid crystal light modulating device obtained using the above liquid crystal light modulating device Further, the insulating cavity is a vacuum cavity.

Further, the insulating cavity is filled with at least one among air, chemically inert gas, aerogel, and liquid.

Further, spacers are positioned in the insulating cavity.

Further, the spacers comprise at least one among the spacers with a shape of strip, sheet, cylinder, or sphere, made of polymer, metal or non-metal materials.

Further, the spacers are bound by adhesive which is a polymerizable polymer with adhesion property to glass and plastic substrates, and the polymer is any one among PVB, EVA, SPU.

The beneficial effect of the present invention is that the present invention provides a liquid crystal light modulating device, by adding a dichroic dye to a component-optimized liquid crystal composition, the functions of privacy protection by way of high scattering or smearing of images and light and dark modulation of light are simultaneously realized in a single-cell light modulating device, and the light modulating device has at least two states that are stable after removal of the applied voltage, and only pulse voltage switching is required, no voltage maintenance is needed, and the power consumption is low; furthermore, the transmittance contrast of the light and dark states of the light modulating device provided can be better than the transmittance contrast of a single-box of conventional dye liquid crystals, and at the same time, it has better energy-saving effect compared to the conventional dye liquid crystals, which improves the value of the liquid crystal light modulating device in practical applications.

DETAILED DESCRIPTION OF THE ILLUSTRATED EMBODIMENTS

In order to make the purpose, technical solutions and advantages of the present invention clearer, the technical solutions of the present invention will be described clearly and completely through following embodiments described with reference to the accompanying drawings. Obviously, the described embodiments are only a part of the embodiments of the present invention, not all of the embodiments, and are not intended to limit the scope of the present invention. Based on the embodiments in the present invention, all other embodiments obtained by the person of ordinary skill in the field without making creative labor are within the scope of protection of the present invention.

Figure 1:
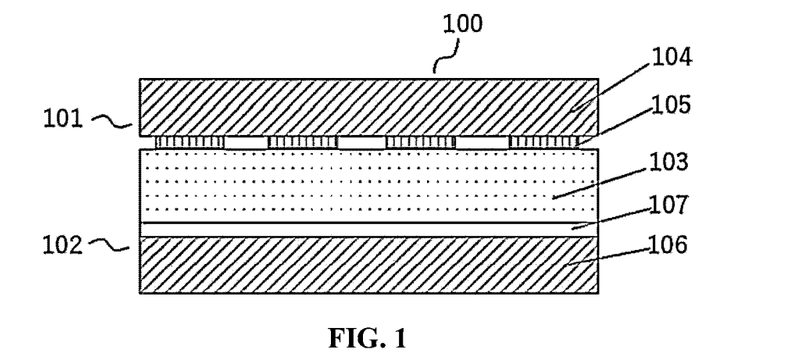
FIG. 1 is an exemplary view illustrating the structure of the liquid crystal light modulating device of the present application.

Reference to the FIG. 1, the liquid crystal device according to the present invention comprises a first transparent conductive substrate 101, a second transparent conductive substrate 102 and a liquid crystal layer 103 between the first transparent conductive substrate 101 and the second transparent conductive substrate 102. The first transparent conductive substrate 101 comprises a first transparent substrate 104 and a first transparent conductive layer 105 adjacent to the liquid crystal layer. The second transparent conductive substrate 102 comprises a second transparent substrate 106 and a second transparent conductive layer 107 adjacent to the liquid crystal layer. In a preferred embodiment, at least one of the first transparent conductive layer 105 and the second transparent conductive layer 107 consist of at least one conductive region which a voltage can be independently applied. In a preferred embodiment, the thickness of the liquid crystal layer 103 is 1-60 μm, and as a further preferred embodiment, the thickness of the liquid crystal layer 103 is 5-50 μm. The liquid crystal layer comprises a liquid crystal composition and dichroic dyes. The liquid crystal composition comprises a nematic liquid crystal composition, chiral compounds and bimesogenic compounds. The arrangement of liquid crystal molecules in the liquid crystal layer is varied depending on the voltage applied between the first transparent conductive substrate 101 and the second transparent conductive substrate 102. In the absence of an applied voltage the arrangement of liquid crystal molecules has at least two substantially stable states, in which at least one is tinted but clear state with low haze where light incident upon the liquid crystal layer can partially transmit through, and at least one is an opaque state where the light incident upon the liquid crystal layer can be absorbed and scattered.

Figure 2:
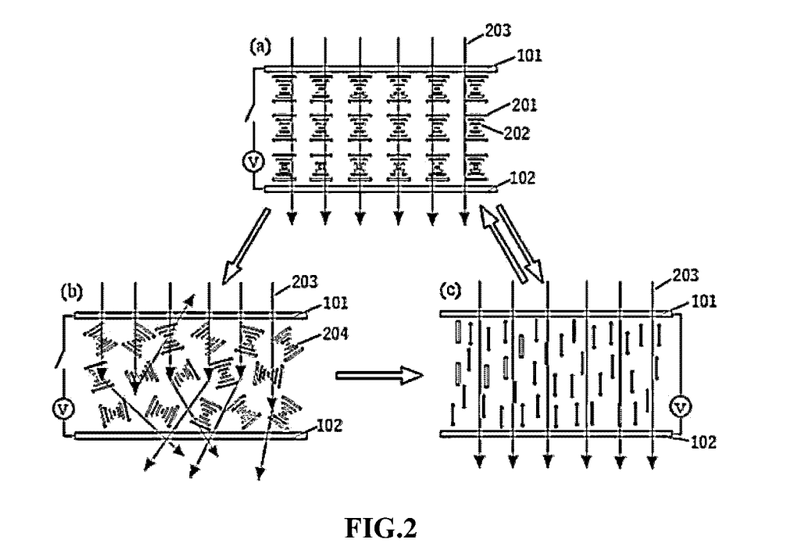
FIG. 2 is an exemplary view illustrating the operating principle of the liquid crystal light modulating device in some embodiments of the present application.

As described the operating principle of the liquid crystal light modulating device with reference to FIG. 2, the arrows 203 indicate the path of the light. Among them, due to the interaction between the interface and the elastic force of the liquid crystal, as shown FIG. 2(a), when no voltage is applied to the liquid crystal layer, the bulk of liquid crystal molecules 201 are arranged substantially parallel to the upper and lower substrates, and the dichroic dye molecules 202 are mixed and dissolved in the liquid crystal and are aligned with the liquid crystal molecules 201. and the liquid crystal and dye molecules are arranged substantially in order to form a helical structure. When an unpolarized light is incident on the liquid crystal layer, the liquid crystal layer absorbs more polarized light whose polarization direction is basically the same as that of the liquid crystal or dichroic molecules director, and for a liquid crystal layer with multiple turns of helical structures, both polarization of light will be absorbed, unless in the special case where the liquid crystal forms so called "waveguide" mode, and the device is in a tinted state. In general, for an unpolarized incident light, the transmitted light may be polarized. Meanwhile, because the liquid crystal molecules are arranged substantially in order, there is little scattering of light, and the liquid crystal light modulating device in this case is in a tinted and low haze state.

An external electric field can be applied to the liquid crystal layer through the first transparent conductive substrate 101 and second transparent conductive substrate 102, and the orientation and structure of liquid crystal molecules depend on the applied field, dielectric anisotropy, elastic forces and the initial alignment of liquid crystals. When the applied electric field is large enough, the liquid crystal molecules 201 can be arranged in a direction roughly parallel to the applied electric field, forming a state in which the liquid crystal molecules 201 and the dichroic dye molecules 202 are arranged roughly perpendicular to the upper and lower substrate as shown in FIG. 2(c). In this case, the arrangement of the liquid crystal molecules and the dye molecules is relatively highly ordered, and the liquid crystal layer has extremely low absorption and scattering of the light incident on it, so that the liquid crystal light modulating device is transparent to incident light with low haze.

In a certain range, due to the relatively strong helical twisting power and elastic interaction of liquid crystal molecules, the applied external electric field can make the liquid crystal to form multiple molecular domains 204 with disordered orientation. Within each molecular domain 204, the liquid crystal molecules still have a basically ordered helical arrangement, while the orientation between the molecular domains 204 is basically disordered, as shown in FIG. 2(b) of the liquid crystal layer. When the applied electric field is removed from the liquid crystal layer, the multi-domain disordered molecular arrangement can be maintained, forming a meta-stable liquid crystal molecular arrangement. When a light is incident on the liquid crystal layer, the multi-domain structure of the liquid crystal molecules can strongly scatter the incident light, and the multi-domain structure of the liquid crystal molecules, especially the disordered arrangement of the dichroic dyes, can fully absorb the incident light, so that liquid crystal layer as a whole produces a high absorption and scattering of the incident light basically independent of the polarization direction, therefore the liquid crystal light modulating device is in a light absorbing and scattering and haze state.

According to the operating principle of the liquid crystal light modulating device provided in this invention, when the voltage V applied to the liquid crystal layer 103 through the first transparent conductive layer 105 and second transparent conductive layer 107 varies, the specific liquid crystal molecule arrangement and its switching speed will change. Meanwhile, the transmission, absorption, and scattering state of the light incident on the liquid crystal layer and the response speed of the light modulating device will change. In addition, when the pulse width of the applied voltage changes, especially when the continuous voltage is applied, the arrangement of liquid crystal molecules can be gradually ordered, forming light modulating device with different luminous flux and scattered luminous flux.

Figure 3:
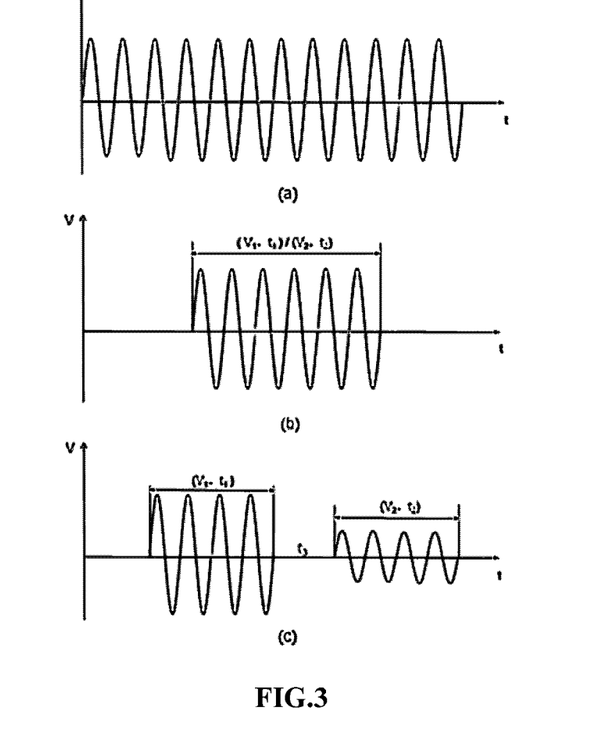
FIG. 3 is an exemplary view illustrating the driving method of the liquid crystal light modulating device of the present application.

The present invention provides a driving method for a liquid crystal light modulating device, which is realized by an applied voltage V as shown in FIG. 3. The applied voltage consists of a single or multiple alternating voltage pulses as shown FIG. 3(a) or FIG. 3(b). Among them, the alternating voltage waveform used for driving the light modulating device of present invention can choose from, but not limited to, any one or more of sine wave, trapezoidal wave, stepped wave, square wave, triangular wave, sawtooth wave.

According to the aforementioned operating principle and driving method, the present invention provides a driving method for realizing transparent and low haze state. No matter what state the light modulating device is in, including the tinted and low haze state shown in FIG. 2(a) and the light absorbing and scattering and high haze state shown in FIG. 2(b), applying an alternating voltage of sufficiently high amplitude as shown in FIG. 3(a) to the liquid crystal layer 103 through the first transparent conductive layer 105 and the second transparent conductive layer 107 causes the molecular arrangement of the liquid crystal layer to be converted to a homeotropic molecular alignment state. Thereby, the liquid crystal light modulating device of the present invention achieves a transparent and low haze state. If the applied voltage shown in FIG. 3(a) is continuously applied, the molecular arrangement of the liquid crystal layer is continuously maintained in the homeotropic and order molecular arrangement shown in FIG. 2(c), and the light modulating device is in a transparent and low haze state.

According to the aforementioned operating principle and driving method, the present invention provides a driving method for realizing tinted and low haze state. The voltage V1 with a pulse width t1 as shown FIG. 3(b) is applied to the liquid crystal layer 103 through the first transparent conductive layer 105 and second transparent conductive layer 107. When the voltage is high enough to make it briefly enter the molecular arrangement state shown in FIG. 2(c) in highly orientationally homeotropic ordered arrangement and the device is in the transparent and low haze state. When the applied electric field is removed, the liquid crystal layer 103 will experience a relaxation from the this vertically aligned state to return to the planar or helical state shown in FIG. 2(a) where the molecules of the liquid crystal layer are basically ordered under the elastic force between the surface force and the liquid crystal molecules. At this time, the light modulating device is in tinted and low haze state. The relaxation process of liquid crystal and dye molecule arrangement from the homeotropic state to the planar state depends on the elastic properties of liquid crystal materials. When the elastic constant of liquid crystal materials K33 is substantially the same as K22, liquid crystal and dye molecules can quickly relax from the homeotropic state to the planar state.

According to the aforementioned operating principle and driving method, the present invention provides a driving method for realizing light absorbing and scattering and high haze state. When the light modulating device is in the planar state with tinted and low haze, the voltage V2 with pulse width t2 shown in FIG. 3(b) is applied to the liquid crystal layer 103 through the first transparent conductive layer 105 and the second transparent conductive layer 107. When the light modulating device is in the multi-domain opaque state with light absorbing and scattering and high haze, the applied pulse voltage series shown in FIG. 3(c) is applied to the liquid crystal layer 103 through the first transparent conductive 105 and the second transparent conductive 107, so that it first enters the tinted and low haze state of the liquid crystal light modulating device, and then the liquid crystal layer is rapidly transformed from basically ordered to multi-domain disordered molecular arrangement state shown in FIG. 2(b). Thus, the liquid crystal light modulating device according to the present invention can achieve the state of light absorbing and scattering and high haze state, and the state with light absorbing and scattering and high haze can be kept stable after the pulse voltage is turned off.

The liquid crystal composition according to the present invention is formed by taking cholesteric phase liquid crystals as the host and adding dichroic dyes as the guest therein to form a guest-host cholesteric liquid crystal material. In the guest-host mode, the alignment of liquid crystal molecules is changed by applying different voltages, presenting the optical properties of cholesteric liquid crystals, while the dichroic dye molecules will be oriented with the liquid crystal orientation, presenting the absorption anisotropy of dichroic dye molecules.

The guest-host cholesteric liquid crystal composition according to the present invention comprises a nematic liquid crystal composition, chiral compounds, and bimesogenic compounds. In a preferred embodiment, the nematic liquid crystals are liquid crystal compounds or liquid crystal mixtures having a nematic phase. The nematic liquid crystal composition accounts for 30 wt %-90 wt % of the liquid crystal composition. Among them, the nematic liquid crystal composition is mainly used to determine basic liquid crystal parameters, such as phase transition point, refractive index anisotropy, and dielectric anisotropy, etc., while the chiral compounds added in the nematic liquid crystal composition can form cholesteric liquid crystals.

In a preferred embodiment, the chiral compounds are chiral liquid crystal materials, and the chiral compounds account for 0.01 wt % to 30 wt % of the liquid crystal composition. The helical pitch P of cholesteric liquid crystal can be adjusted by chiral compounds. It can be seen from the formula $P=1/(HTP*c)$, where HTP is the helical twisting power constant and c is the concentration of chiral compounds. The helical pitch P can be adjusted by selecting chiral compounds with different HTP or adjusting the concentration of chiral compounds. The helical pitch P affects the Bragg reflection waveband of the planar state. According the solar energy spectrum, in order to obtain the higher solar heat gain coefficient difference between the planar state and the homeotropic state, the Bragg reflection waveband is generally adjusted to the visible and near-infrared region where the solar radiation energy density is highest. The helical pitch P also affects the haze, and it is necessary to control a certain value of d/P (the d is thickness the liquid crystal layer) in order to obtain the higher haze of the light scattering state. However, for general chiral nematic liquid crystals, high d/P value is easy to cause defects in the planar state, resulting in high and non-uniform haze in the planar state.

The bimesogenic compound is an elastic constant adjuster. After it is added to the chiral nematic liquid crystals, a relatively high splay elastic constant K11, relatively low bend elastic constant K33 and relatively low twist elasticity coefficient K22 can be obtained. The driving voltage of liquid crystal molecules driven from any other state to the homeotropic state is directly proportional to the square root of K22, so the relatively low K22 can obtain a relatively low driving voltage of the homeotropic state. Furthermore, when the liquid crystal molecules are switched from the homeotropic state back to the planar state, their helical pitch changes from infinity to a natural helical pitch, $P'=K33/K22*P$. When $K33 \approx K22$, the liquid crystal molecules can quickly recover from the homeotropic state to the planar state, and achieve the perfect planar state with a very small haze.

In a preferred embodiment, the bimesogenic compound is a liquid crystal compound with two bimesogenic units, which is a compound of formula I:

R1-MG1-X-MG2-R2    I

Wherein

R1 and R2 are each independently H, F, Cl, or a alkyl group with 1 to 25 C atoms wherein one and more hydrogen atoms may be independently substituted by halogen and one or more non-adjacent —CH2- groups may be independently substituted by —O—, —CH=CH—, —CH=CF—, or —CF=CF—, MG1 and MG2 are each independently a mesogenic group, X is a straight-chain or branched alkyl group with 3 to 40 C atoms wherein one or more non-adjacent —CH2- groups may be independently substituted by —O—, —CH(F)—, —CH(Cl)—, —CH=CH—, however in such a way that no two O-atoms are adjacent to one another, no two double bonds (—CH=CH—) are adjacent to each other;

and wherein the bimesogenic compound is in an amount from 10% to 50% by weight based on the liquid crystal composition.

The liquid crystal layer of the present invention further comprises dichroic dyes. In a preferred embodiment, the dichroic dyes are capable mutually soluble in the liquid crystal composition. The dichroic dyes are affected by the arrangement of the liquid crystal molecules to form a certain ordering arrangement, and the order parameter of the dichroic dyes is between 0.1 and 1. The dichroic dyes account for 0.01 wt % to 5 wt % of the liquid crystal composition.

The dichroic dyes can be selected and used from known conventional dyes that are oriented according to the orientation state of the liquid crystal compound due to the so-called guest-host effect, but no specific restrictions are made in this invention. The orientation characteristics of the dichroic dyes in accordance with the liquid crystal compounds are expressed in terms of the order parameter which is not only related to the structure of the dyes per se, but is also related to the nature of the host liquid crystals. Generally, the higher the order parameter of the dichroic dyes, the higher the order in accordance with the liquid crystal orientation. However, since the order parameter of existing dichroic dyes is less than 1, even though the liquid crystal molecules can basically be oriented with the electric field, there is always a portion of dye molecules that cannot be fully oriented with the liquid crystal molecules and this portion of dye molecules absorbs a portion of the light, and thus there is some weak absorption even in the transparent homeotropic state. In general, the larger the ordered parameter, the higher the contrast between the homeotropic state and the planar state or the focal conic state. Therefore, in order to obtain a higher contrast, dichroic dyes with high order parameter are generally selected, and the solubility of dichroic dyes in the host liquid crystals, extinction coefficient, optothermal stability, and electrical resistivity of dichroic dyes should also be considered. In addition, the concentration and the type of the dichroic dyes can be changed to obtain the devices with different dynamic modulation range of the solar radiation. And when the composition and content of the dye are appropriate, it is possible to realize that the difference between the maximum transmittance state and the minimum transmittance state of the on-axis incident thereon is greater than 50%. Furthermore, it is possible to realize that the difference between the maximum transmittance state and the minimum transmittance state of the on-axis light incident thereon is greater than 60%. When the dye content is high enough, the maximum transmittance of the on-axis light incident thereon can be reduced to less than 30%, and the corresponding difference between the maximum transmittance state and the minimum transmittance state of the on-axis light incident thereon will also be reduced.

In a preferred embodiment, the doped dichroic dyes preferably consists two or more, and more preferably three or more components or colors covering different absorption spectrum ranges, and the categories of dichroic dyes and the precise mixing of the dichroic dyes are known to those skilled in the art, and are not specifically limited by this invention.

In a preferred embodiment, the dichroic dyes have a single component. The dichroic dyes have an absorption peak in any waveband between 300 nm and 2500 nm. The dichroic dyes may also be a mixture comprising a plurality of components. The absorption peak of each component is in any waveband between 300 nm and 2500 nm and these absorption peaks of each component are not overlapped.

In a preferred embodiment, the first transparent substrate and said second transparent substrate are flat glass, tempered glass, semi-tempered glass, float glass, or plastic substrate film. As a further preferred embodiment, the plastic substrate film is selected from at least one of PET film, PI film, PTFE film, PP film, PC film, PVC film, PE film, PS film, PA film, PEN film, PMMA film, and PBT film, but the present invention is not limited thereto.

In a preferred embodiment, the material of the first transparent conductive layer and said second transparent conductive layer is any one of a metal oxide film, a metallic nanowire-based conductive film, a metallic mesh, and a carbon nanotube-based conductive film. In a preferred embodiment, the liquid crystal light modulating device further comprises a first alignment layer and/or a second alignment layer disposed on the side of the first transparent conductive layer and/or the second transparent conductive layer adjacent to the liquid crystal layer. As a further preferred embodiment, the material of the first alignment layer and/or the second alignment layer is any one of polyimide, polyvinyl alcohol, polyester, an epoxy resin, polyurethane, polysilane, polystyrene and derivatives thereof. As a further preferred embodiment, the alignment method of the first and/or second alignment layer is any one of rubbing alignment method, photoalignment method, oblique angle deposition, or Langmuir-Blodgett (LB) film alignment. As a further preferred embodiment, the alignment mode of the first and/or second alignment layer is any one of IPS, TN, STN, or VA. As further preferred embodiment, the operation applied by the alignment of the first alignment layer and/or second alignment layer is any one of the spin coating, dip coating, flexographic printing, spray painting, or slot-die coating. But the present invention is not limited thereto.

In a preferred embodiment, a spacer material is provided between the first transparent conductive substrate layer and the second transparent conductive substrate layer. The spacer material is selected from at least one of resin, glass fiber, and inorganic material, and the shape of the spacer material comprises ball, rod-like, or mixture shape.

In a preferred embodiment, the liquid crystal light modulating device can be in at least three states for visible light and near-infrared light incident thereon: transparent and low haze state, tinted and low haze state, light absorbing and scattering and high haze state. As a further preferred embodiment, the transparent and low haze state is obtained by continuously applying the first voltage between the first transparent conductive layer and the second transparent conductive layer, in which the liquid crystal molecules in the liquid crystal layer and the absorption axis of the dye molecules in the light modulating device are aligned roughly perpendicular to the first transparent conductive layer and second transparent conductive layer. The tinted and low haze state is obtained by applying a second voltage between the first transparent conductive layer and the second transparent conductive layer, in which the liquid crystal molecules in the liquid crystal layer and the absorption axis of the dye molecules in the light modulating device are arranged roughly parallel to the first transparent conductive layer and second transparent conductive layer and have a certain helical structure arrangement, which is an absorbing and transmitting planar state with absorption and transmittance that meets the Bragg reflection characteristics, can reflect light with waveband $\lambda=nP$, where n is the average refractive index of the liquid crystal, P is the helical pitch of the cholesteric liquid crystal. The light absorbing and scattering and high haze state is obtained by applying the third voltage between the first transparent conductive layer and the second transparent conductive layer, in which the liquid crystal molecules in the liquid crystal layer of the light modulating device present a random arrangement of focal conic state, which is an absorbing and scattering state, and offers good privacy protections.

As a further preferred embodiment, the transparent and low haze state has a transmittance of not less than 30% and a haze of not more than 5%; the tinted and low haze state has a transmittance of not more than 50% and a haze of not more than 10%; the light absorbing and scattering and high haze state has a transmittance of not more than 40% and a haze of not less than 60%.

As a further preferred embodiment, the transmittance of the transparent, low haze state and tinted, low haze state can be adjusted according to the composition and concentration of the doped dichroic dyes, and the ratio of the transmittance of the transparent, low haze state to the transmittance of said tinted, low haze state to the transmittance of a particular wavelength or range of wavelengths of incident light can be greater than 2:1.

In a preferred embodiment, the first voltage is a continuous voltage, the second voltage and the third voltage are pulse voltages. As a further preferred embodiment, the first voltage is an alternating voltage having an amplitude of 10-500V and a frequency of 20-10000 Hz; the second voltage is an alternating pulse voltage comprising a continuous pulse or a plurality of different or same pulses and having an amplitude of 10-300V, a frequency of 20-10000 Hz and a pulse width of 0.01-300 s; the third voltage is an alternating pulse voltage comprising one continuous pulse or a plurality of different or identical pulses, and having an amplitude of 10-300V, a frequency of 20-10000 Hz and a pulse width of 0.01-300 s. As a further preferred embodiment, said continuous voltage comprises a gradient voltage in combination with the pulse voltage to realize a transmissive, low haze state driven by a high voltage first, and then maintained by a low voltage, in order to reduce the power consumption; as an even further preferred embodiment, said pulse voltage amplitude, frequency, and pulse width are the same or different as said second voltage and said third voltage same or different. As a further preferred embodiment, the continuous voltage comprises a gradient voltage in combination with the pulse voltage to realize a transparent, low haze state driven by a high voltage first, and then maintained by a low voltage, in order to reduce the power consumption. As an even further preferred embodiment, the pulse voltage amplitude, frequency, and pulse width are the same or different as the second voltage and the third voltage.

Figure 9:
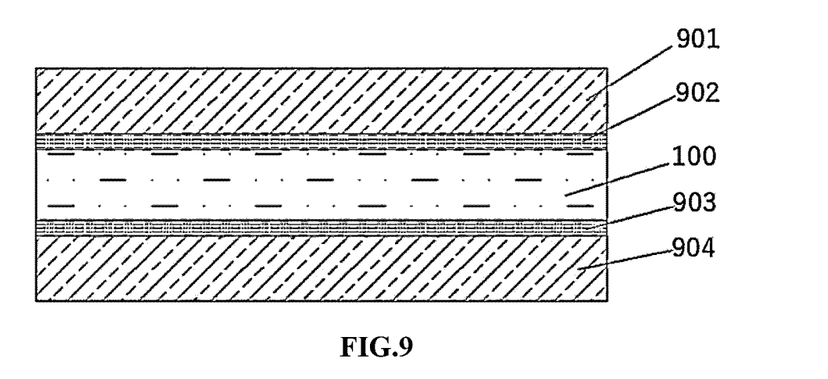
FIG. 9 is an exemplary view illustrating the structure of the laminated liquid crystal light modulating device of the present application.

To further realize the purpose of the present invention, the present invention also provides a laminated liquid crystal light modulating device obtained by using the above liquid crystal light modulating device, as shown in FIG. 9, comprising a first substrate 901, a first adhesive layer 902, a liquid crystal light modulating device 100, a second adhesive layer 903, and a second substrate 904 disposed in sequence.

In a preferred embodiment, the first adhesive layer 902 and the second adhesive layer 903 are polymerizable polymer compound layers with adhesive properties. The polymer compound layers are selected from any one or more of PVB, EVA, SPU, but the present invention is not limited thereto.

In a preferred embodiment, the first substrate 901 and the second substrate 904 are made of the same or different materials; as a further preferred embodiment, the materials of the first substrate and the second substrate are selected from one or more of glass, tempered glass, Low-e glass, special glass having the ability to block electromagnetic radiation, and plastic substrate.

Figure 10:
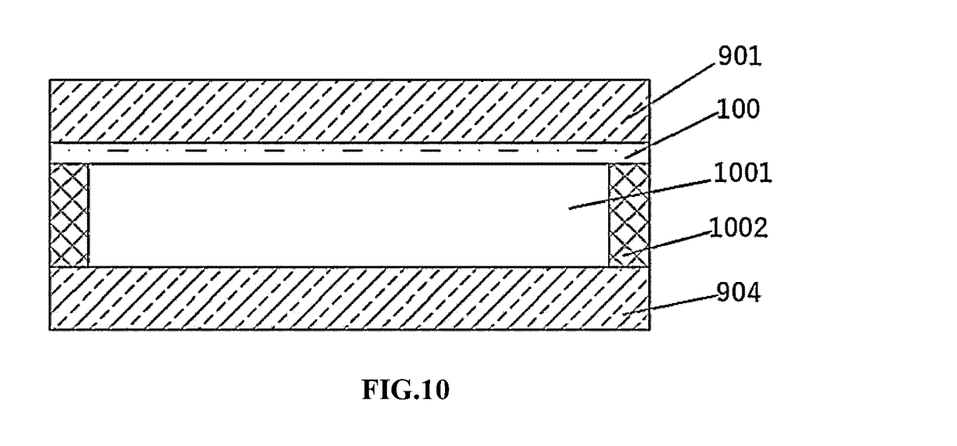
FIG. 10 is an exemplary view illustrating the structure of the insulated liquid crystal light modulating device of the present application.

In order to further realize the purpose of the present invention, the present invention also provides an insulating liquid crystal light modulating device obtained by using the liquid crystal light modulating device, as shown in FIG. 10, comprising a first substrate 901, a liquid crystal light modulating device 100, and a second substrate 904 disposed in sequence, and further comprising a insulating cavity 1001.

In a preferred embodiment, said insulating cavity 1001 is vacuum or a cavity filled with any one or more of air, inert gas, aerogel, or liquid. As a further preferred embodiment, the insulating cavity is provided with a spacer material 1002; as a further preferred embodiment, the spacer material is made of any one or more of polymers, metallic or non-metallic strips, sheets, cylinder, spherical spacers; as a further preferred embodiment, the spacer material is fixed by adhesive which is a polymer compound that can be polymerized and has adhesive properties for glass and plastic substrate, and the polymer compound is any one of PVB, EVA, and SPU, but the present invention is not limited thereto.

In the present invention and especially in the following embodiments, the group structures in the liquid crystal composition are also code-identified. Table 1 shows the group structures and codes used for the nematic liquid crystal composition as well as the bimesogenic compounds.

TABLE 1

| Liquid crystal composition group structure code | |
|---|---|
| Code | Group structure |
| P |  |
| C |  |
| G |  |
| P(2-F) |  |

TABLE 1-continued

| Liquid crystal composition group structure code | |
|---|---|
| Code | Group structure |
| P$^{22}$ |  |
| P$^{21}$ |  |
| —CF$_2$O— | Q |
| N | —C≡N |
| O | —O— |
| F | —F— |
| n | C$_n$H$_{2n+1}$ |

Where, "5PPN", according to the naming principle in Table 1, its corresponding structure is:

"n=3", which according to the nomenclature principle according to Table 1, corresponds to the structure: —C$_3$H$_7$.

In the present invention, the structural molecular formulae, corresponding codes and HTP values of the chiral compounds added to the liquid crystal compositions are also provided, and the results are shown in Table 2.

TABLE 2

The structural molecular formulae, codes and HTP values of the chiral compounds added to the liquid crystal compositions

| Code | Structural formula | HTP/μm$^{-1}$ |
|---|---|---|
| CB15 | (structure shown) | 6.6 |
| R811 | (structure shown) | 10.0 |
| R5011 | (structure shown) | 99.0 |

In the present invention, the codes and order parameters of the dichroic dyes added to the liquid crystal compositions are also provided, and the results are in Table 3, wherein the order parameters can be determined as follow: the dichroic dyes are mixed into the nematic liquid crystal compositions of the following preparatory example 1, and the dye mixed crystals with a mass concentration of 1% are prepared, and stirred sufficiently at 120° C. for 1 h; the dye mixed crystals are cooled down to room temperature and then poured into two liquid crystal cells with thickness of 10 μm and the alignment having anti-parallel rubbing alignment of upper and lower surfaces, and the polarization of the light is parallel to and perpendicular to the rubbing orientation of the liquid crystal cells, respectively, and the order parameter is obtained by calculating the order parameter by substituting it into the formula below;

$$S = \frac{A_{//} - A_{\perp}}{A_{//} + 2A_{\perp}}$$

TABLE 3

The codes and order parameters of dichroic dyes added to the the liquid crystal compositions

| Code | Components | Order parameter |
|---|---|---|
| R1 | Mixed black color from three components | 0.79 |
| R2 | Mixed black color from three components | 0.78 |
| R3 | Mixed dark blue from two components | 0.71 |

EXAMPLE

The present invention provides 3 sets of preparation examples and 14 sets of embodiments to demonstrate the apparatus and methods of the present disclosure, shown in Table 4-6 and Table 7, respectively; wherein preparation examples 1-3 represent nematic liquid crystal compositions of different compositions, respectively. It should be noted that the following embodiments are illustrative only and are not intended to limit the present disclosure to the materials, conditions, or process parameters set forth herein.

Preparation Example 1

TABLE 4

Formula 1 of nematic liquid crystal composition

| Component Code | Content/% |
|---|---|
| 5PPN | 25 |
| 2PPN | 9.3 |
| 5OPPN | 19 |
| 6OPPN | 9.3 |
| 3PGPN | 20 |
| 5CPPN | 11 |
| 5PPPN | 5.6 |

Preparation Example 2

TABLE 5

Formula 2 of nematic liquid crystal composition

| Component Code | Content/% |
|---|---|
| 5PPN | 19 |
| 2PPN | 7.4 |
| 5OPPN | 11 |
| 6OPPN | 4.6 |
| 3PGPN | 19 |
| 5CPPN | 11 |
| 5PPPN | 10 |

TABLE 5-continued

Formula 2 of nematic liquid crystal composition

| Component Code | Content/% |
|---|---|
| 5PGP$^{22}$QP$^{22}$F | 3.7 |
| 4PGP$^{22}$QP$^{22}$F | 3.7 |

Preparation Example 3

TABLE 6

Formula 3 of nematic liquid crystal composition

| Component Code | Content/% |
|---|---|
| 5PPN | 19 |
| 2PPN | 7.4 |
| 5OPPN | 11 |
| 6OPPN | 4.6 |
| 3PGPN | 19 |
| 3PP(2-F)PN | 13 |
| 5CPPN | 10 |
| 5PPPN | 15 |
| 5PGP$^{22}$QP$^{22}$F | 3.7 |

Embodiment 1-14

In order to verify that the technical solutions provided in this invention have excellent technical effects, the liquid crystal compounds in each embodiment were fabricated into corresponding liquid crystal light modulating devices, and their performance was tested.

(1) Liquid Crystal Light Modulating Device Structure

In the liquid crystal light modulating device of Example 1-5 and Example 8-14, the transparent conductive substrates are ITO transparent glass, the alignment layers are of the VA mode and treated by rubbing alignment, the liquid crystal layer has a thickness of 20 μm, and the support structure is a spherical polystyrene spacer, which accounts for 0.2 wt % of the liquid crystal composition;

Distinguishing from Embodiments 1-5 and Embodiments 8-14, in the liquid crystal light modulating device of Embodiment 6, the alignment layer is of the IPS mode, orientation is performed by upper and lower counter-parallel friction, and the liquid crystal layer thickness is 15 μm; in the liquid crystal light modulating device of Example 7, the alignment layer is of the VA type, and the liquid crystal layer thickness is 10 μm.

(2) Transmittance and Haze Evaluation

The liquid crystal light modulating device is placed at a constant temperature of 25° C. for more than 30 minutes, and driven to tinted and low haze state and light absorbing and scattering and high haze state by pulsed voltage, and driven to transparent and low haze state by continuous

TABLE 7

Formula 3 of nematic liquid crystal composition of the embodiments 1-14

| | | Embodiment 1 | Embodiment 2 | Embodiment 3 | Embodiment 4 | Embodiment 5 | Embodiment 6 | Embodiment 7 |
|---|---|---|---|---|---|---|---|---|
| Nematic liquid crystal composition | Preparation Example 1 | 54 | 54 | 54 | 54 | 54 | 54 | |
| | Preparation Example 2 | | | | | | | |
| | Preparation Example 3 | | | | | | | |
| Chiral compound | CB15 | 16 | 16 | 16 | 16 | 16 | 16 | |
| | R811 | | | | | | | |
| | R5011 | | | | | | | |
| Bimesogenic compound | NPP7PPN | 20 | 20 | 20 | 20 | 20 | 20 | 20 |
| | NPP9PPN | 5 | 5 | 5 | 5 | 5 | 5 | 5 |
| | NPP11PPN | 5 | 5 | 5 | 5 | 5 | 5 | 5 |
| | NP(2-F)P7PGN | | | | | | | |
| | NP$^{22}$P7PP$^{21}$N | | | | | | | |
| Dichroic dye | R1 | 0.5 | | | 1 | 2 | 1 | 1 |
| | R2 | | 0.5 | | | | | |
| | R3 | | | 0.5 | | | | |

| | | Embodiment 8 | Embodiment 9 | Embodiment 10 | Embodiment 11 | Embodiment 12 | Embodiment 13 | Embodiment 14 |
|---|---|---|---|---|---|---|---|---|
| Nematic liquid crystal composition | Preparation Example 1 | 61 | 60 | 69 | | | | |
| | Preparation Example 2 | | | | 54 | | | |
| | Preparation Example 3 | | | | | 54 | | |
| Chiral compound | CB15 | 9 | | | | 16 | 16 | 16 |
| | R811 | | 10 | | | | | |
| | R5011 | | | 1 | | | | |
| Bimesogenic compound | NPP7PPN | 20 | 20 | 20 | 20 | 20 | 18 | 15 |
| | NPP9PPN | 5 | 5 | 5 | 5 | 5 | 6 | 7 |
| | NPP11PPN | 5 | 5 | 5 | 5 | 5 | | |
| | NP(2-F)P7PGN | | | | | | 6 | 3 |
| | NP$^{22}$P7PP$^{21}$N | | | | | | | 3 |
| Dichroic dye | R1 | 0.5 | 0.5 | 0.5 | 0.5 | 0.5 | 0.5 | 0.5 |
| | R2 | | | | | | | |
| | R3 | | | | | | | | voltage, after which the transmittance and haze are measured by WGT-S haze meter and the contrast is calculated, which is the ratio of the maximum transmittance of the two states, i.e., D1=T (transparent, low haze state)/T (tinted, low haze state), D2=T (high HD transmittance, low haze state)/T (light absorbing and scattering, high haze state), and the results are shown in Table 8, where T denotes the transmittance rate and H denotes the haze.

TABLE 8

Transmittance, haze and contrast of liquid crystal light modulating devices made in Embodiments 1-14

| | transparent, low haze state | | tinted, low haze state | | light absorbing and scattering, high haze state | | | |
|---|---|---|---|---|---|---|---|---|
| | T/% | H/% | T/% | H/% | T/% | H/% | D1 | D2 |
| Embodiment 1 | 67.7 | 0.25 | 32.0 | 0.46 | 20.8 | 84.21 | 2.1 | 3.3 |
| Embodiment 2 | 68.1 | 0.39 | 33.7 | 0.59 | 21.9 | 84.18 | 2.0 | 3.1 |
| Embodiment 3 | 53.8 | 0.13 | 16.7 | 0.06 | 11.9 | 82.3 | 3.2 | 4.5 |
| Embodiment 4 | 50.4 | 0.1 | 10.2 | 0.09 | 9.0 | 79.86 | 4.9 | 5.6 |
| Embodiment 5 | 33.5 | 0.03 | 2.7 | 0.31 | 3.8 | 70.30 | 12.4 | 8.8 |
| Embodiment 6 | 58.7 | 1.34 | 19.4 | 2.47 | 14.1 | 82.98 | 3.0 | 4.2 |
| Embodiment 7 | 66.3 | 0.33 | 29.9 | 0.53 | 25.3 | 78.84 | 2.2 | 2.6 |
| Embodiment 8 | 68.7 | 0.06 | 31.4 | 1.75 | 31.2 | 83.08 | 2.2 | 2.2 |
| Embodiment 9 | 65.2 | 0.95 | 26.1 | 1.29 | 17.8 | 84.36 | 2.5 | 3.7 |
| Embodiment 10 | 68.0 | 0.07 | 28.0 | 0.15 | 19.6 | 84.02 | 2.4 | 3.5 |
| Embodiment 11 | 68.4 | 0.01 | 31.0 | 1.12 | 20.4 | 84.18 | 2.2 | 3.4 |
| Embodiment 12 | 69.1 | 0.06 | 31.7 | 0.87 | 19.2 | 84.30 | 2.2 | 3.6 |
| Embodiment 13 | 67.7 | 0.1 | 33.5 | 0.45 | 20.8 | 83.23 | 2.0 | 3.3 |
| Embodiment 14 | 62.4 | 0.08 | 24.9 | 1.56 | 19.5 | 78.99 | 2.5 | 3.2 |

(3) Haze Stability Test

The liquid crystal light modulating device will be placed in the 25° C. environmental chamber at a constant temperature for more than 30 minutes, select the appropriate voltage were driven to tinted, low haze state and light absorbing and scattering, high haze state, and then placed in the 25° C. environmental chamber placed in 16 hours, after removing the use of WGT-S haze meter to measure the transmittance rate and haze, the results are shown in Table 9.

TABLE 9

Transmittance and haze of the liquid crystal light modulating devices made in Embodiments 1-14 after 16 hours of placement

| | tinted, low haze state | | light absorbing and scattering, high haze state | |
|---|---|---|---|---|
| | T/% | H/% | T/% | H/% |
| Embodiment 1 | 31.8 | 0.55 | 22.2 | 81.48 |
| Embodiment 2 | 33.5 | 0.62 | 23.2 | 81.57 |
| Embodiment 3 | 17.0 | 0.42 | 13.4 | 79.98 |
| Embodiment 4 | 9.7 | 0.00 | 10.8 | 78.14 |
| Embodiment 5 | 2.0 | 0.87 | 4.5 | 69.71 |
| Embodiment 6 | 20.7 | 1.51 | 15.1 | 80.60 |
| Embodiment 7 | 30.1 | 0.09 | 30.6 | 60.55 |
| Embodiment 8 | 9.6 | 0.00 | 31.5 | 80.44 |
| Embodiment 9 | 25.9 | 0.65 | 18.2 | 83.55 |
| Embodiment 10 | 28.0 | 0.26 | 20.3 | 83.19 |
| Embodiment 11 | 31.1 | 0.33 | 20.5 | 83.72 |
| Embodiment 12 | 31.8 | 0.56 | 19.8 | 83.12 |
| Embodiment 13 | 33.1 | 0.67 | 23.3 | 79.99 |
| Embodiment 14 | 24.6 | 0.47 | 20.7 | 78.94 |

As can be seen from the data in Tables 8-9, the light modulating device of the present invention can realize both light and dark modulation and haze modulation in a single-cell device, wherein, the transparent and low haze state transmittance rate is not lower than 30%, and the haze is not higher than 5%, and ideally, the haze is not higher than 1%; the tinted and low haze state transmittance rate is not higher than 50%, and the haze is not higher than 10%, and ideally, the haze is not higher than 2%; the light absorbing and scattering, high haze state transmittance of no more than 40%, haze of no less than 60%, and ideally, haze of no less than 75%. In addition, tinted, low haze state and light absorbing and scattering, high haze state are all stable states that only need pulse voltage to switch, almost zero power consumption and can still be maintained for a long time after the voltage is removed. Ideally, the haze change of the device in these stable states placed in 16 hours is not more than 5%, more ideally, the haze change of the device in these stable states placed in 16 hours is not more than 2%. Therefore, it has the advantages of safety in power failure and good stability of haze.

From the contrast shown in Table 8, it can be seen that when the liquid crystal and dye composition, dye concentration, cell thickness, interface conditions are appropriate, the transmittance contrast between the transparent, low haze state and the tinted, low haze state for a specific wavelength or wavelength range of incident light can be greater than 2, which is better than the transmittance contrast of the light and dark state of the ordinary GH-type nematic single-cell device. This is due to the addition of chiral dopant makes the planar state has a certain helical structure. When the helical pitch is small, the liquid crystal molecules in the same thickness of the liquid crystal layer increase the number of rotating circles, multi-layer reflection is conducive to the absorption of incident light, and the light absorbing and scattering and high haze state due to the combined effect of absorption and scattering effect makes its light transmittance relative to the tinted, low haze state further reduced. The transmittance contrast between the transparent, low haze state and the light absorbing and scattering, high haze state for incident light of a specific wavelength or wavelength range is further increased, which can be greater than 3 in the same case, and at the same time it is foreseeable to be able to achieve higher contrast by increasing order parameter of the dichroic dyes.

Figure 4:
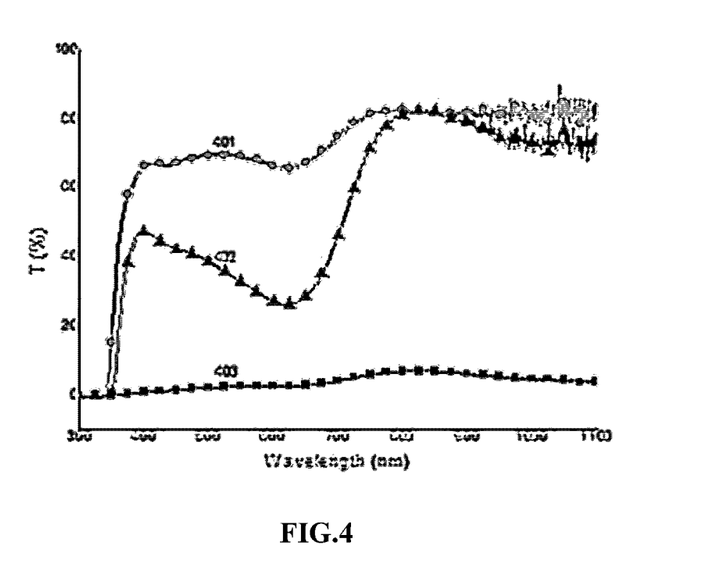
FIG. 4 is an exemplary view illustrating the UV, visible and near-infrared transmission spectra of the liquid crystal light modulating device in first embodiment using on-axis light.
Figure 5:
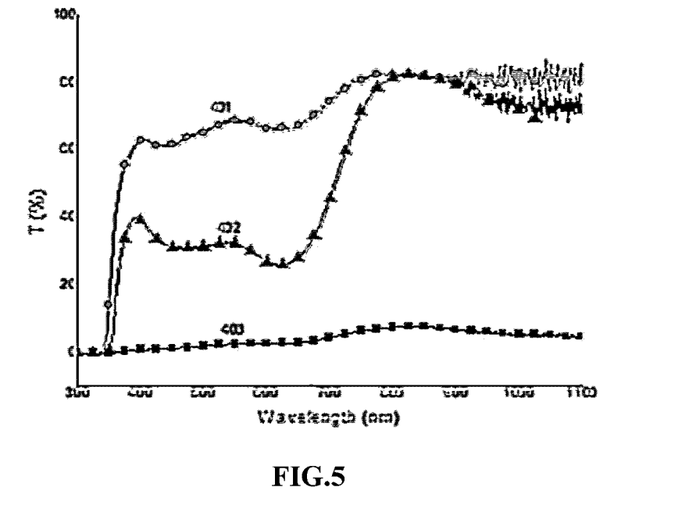
FIG. 5 is an exemplary view illustrating the UV, visible and near-infrared transmission spectra of the liquid crystal light modulating device in the second embodiment using on-axis light.

As can be seen from FIGS. 4-5, the light absorbing and scattering, high haze state 403 of the liquid crystal light modulating device of the present invention has an on-axis light transmittance of ≤3% with wavelength of 300 nm-650 nm, an on-axis light transmittance of ≤7% with wavelength of 650 nm-1100 nm, and a very low on-axis light transmittance in the UV, visible, and near-infrared region. In combination with the data in Tables 8 and 9, it can be seen that the light absorbing and scattering, high haze state 403 has a high haze and stability of haze, and it can be shown that the light modulating device of the present invention has excellent privacy protection function. As can be seen from FIGS. 4-5, the maximus transmittance state of on-axis light incident thereon is transparent, low haze state 401, and the minimum transmittance state of on-axis light incident thereon is light absorbing and scattering, high haze state 403. The transparent, low haze state 401 of the liquid crystal light modulating device of the present invention has on-axis light transmittance in the range of 66% to 70% with wavelength of 400 nm-650 nm, and in the range of 67% to 82% with wavelength of 650 nm-1100 nm. The difference between the maximum transmittance state and the minimum transmittance state for on-axis light incident thereon is greater than 50%. The UV, visible and near-infrared on-axis light transmission spectra of Embodiments 3-14 have predictable principle effects similar to those of Embodiment 1 and Embodiment 2, and will not be repeated herein.

Figure 6:
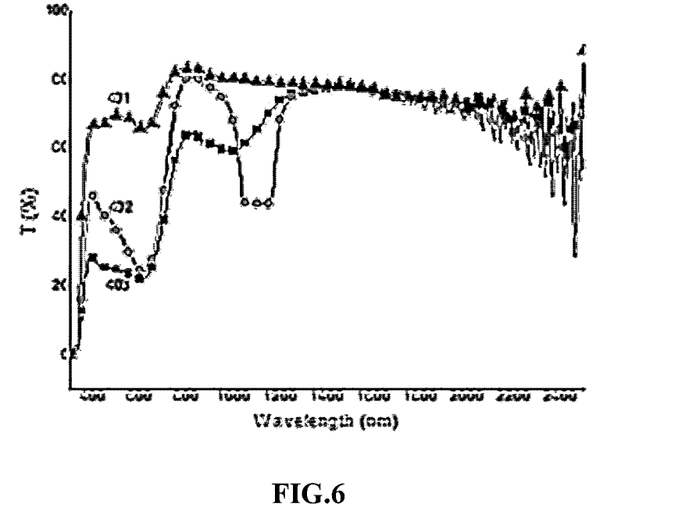
FIG. 6 is an exemplary view illustrating the UV, visible and near-infrared transmission spectra of the liquid crystal light modulating device in the first embodiment using integrating sphere.
Figure 7:
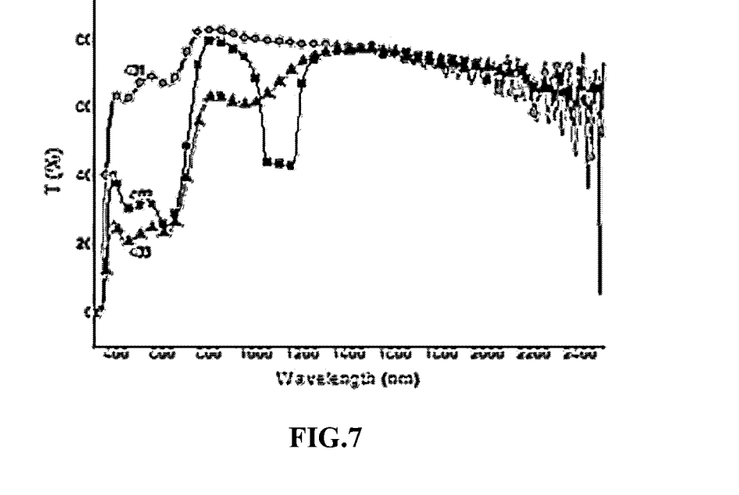
FIG. 7 is an exemplary view illustrating the UV, visible and near-infrared transmission spectra of the liquid crystal light modulating device in the second embodiment using integrating sphere.

As can be seen from FIGS. 6-7, the liquid crystal light modulating device in the present invention has a dynamic modulation range of solar radiation, i.e., the transparent and low haze state 401 has mainly transmittance in the full waveband range, the tinted and low haze state 402 has absorption in visible light range and reflection in near-infrared range, the reflection waveband is derived from Bragg reflection and can be adjusted to visible, near-infrared, infrared range in some embodiments, the light absorbing and scattering and high haze state 403 has absorption in visible light range and scattering in near-infrared range. Compared to ordinary GH-type nematic single-cell devices, the tinted and low haze state 402 adds the wide reflection waveband, and Compared to the cholesteric bistable light modulating device and the PDLC haze dimming device, the tinted and low haze state 402 adds the wide visible range absorption, which has more energy saving effect. UV, visible, near-infrared transmission spectra of Embodiments 3-14 using integrating sphere have predictable principle effects similar to those of Embodiment 1 and Embodiment 2, and will not be repeated herein.

Figure 8:
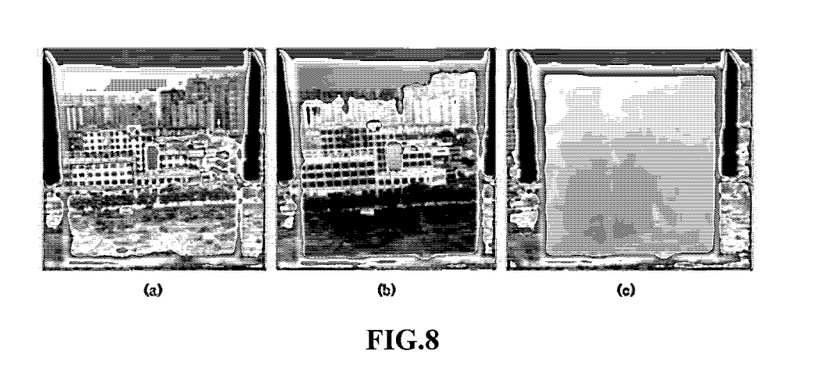
FIG. 8 contains photographs of the liquid crystal light modulating device of the first embodiment in (a) a transparent, low haze state, (b) a tinted, low haze state, and (c) a light absorbing and scattering, high haze state at a corresponding drive voltage.

FIG. 8 illustrates a working effect diagram of the liquid crystal light modulating device in Embodiment 1, FIG. 8(*a*) illustrates that it is in a transparent and low haze state under the corresponding driving voltage, FIG. 8(*b*) illustrates that it is in a tinted, low haze state under the corresponding driving voltage, and FIG. 8(*c*) illustrates that it is in a light absorbing and scattering and high haze state under the corresponding driving voltage.

Although this specification is described in accordance with the embodiments, but not each embodiment contains only one independent technical solution, the specification of this description is only for the sake of clarity, the person skilled in the art should take the specification as a whole, the technical solution in each embodiment can also be combined appropriately to form other embodiments that can be understood by the person skilled in the art.

The above listed series of detailed description is only for the feasibility of the present invention of the implementation of the specific description, they are not used to limit the scope of protection of the present invention, where not out of the spirit of the art of the present invention of the equivalent implementation of the spirit of the invention or change should be included in the scope of protection of the present invention.

The invention claimed is:

1. A liquid crystal light modulating device, comprising:
a first transparent conductive substrate;
a second transparent conductive substrate; and
a liquid crystal layer between the first and second transparent conductive substrates;
wherein the first transparent conductive substate comprises a first transparent substrate and a first transparent conductive layer positioned adjacent to the liquid crystal layer, and the second transparent conductive substate comprises a second transparent substrate and a second transparent conductive layer adjacent to the liquid crystal layer;
wherein the liquid crystal layer comprises a liquid crystal composition and dichroic dyes, the liquid crystal composition includes a nematic liquid crystal composition, chiral compounds and elastic constant adjuster;
wherein the arrangement of liquid crystal molecules in the liquid crystal layer is varied depending on the voltage applied between the first conductive substrate and second conductive substrate; wherein the arrangement of liquid crystal molecules has at least two stable states which remain substantially stable in the absence of an applied voltage, at least one of the stable states is a transmissive state, wherein, for visible light incident on the liquid crystal layer, a collimated transmitted flux is greater than a scattered transmitted flux, at least one of the stable states is an opaque state, wherein, for visible light incident on the liquid crystal layer, the collimated transmitted flux is less than that in the transmissive state.

2. The liquid crystal light modulating device of claim 1, wherein the nematic liquid crystal composition includes a nematic liquid crystal compound or liquid crystal mixture, and the nematic liquid crystal composition is in an amount from 30% wt to 90% of the liquid crystal composition.

3. The liquid crystal light modulating device of claim 1, wherein the chiral compound is chiral liquid crystal, and the chiral compound is in an amount from 0.01% wt to 30% wt of the liquid crystal composition.

4. The liquid crystal light modulating device of claim 1, wherein the elastic constant adjuster comprises bimesogenic compound.

5. The liquid crystal light modulating device of claim 4, wherein the bimesogenic compound is a liquid crystal compound with two bimesogenic units, which is a compound of formula I:

$$R1\text{-}MG1\text{-}X\text{-}MG2\text{-}R2 \qquad \mathrm{I}$$

Wherein

R1 and R2 are each independently H, F, Cl, or a alkyl group with 1 to 25 C atoms wherein one and more hydrogen atoms may be independently substituted by halogen and one or more non-adjacent —CH2- groups may be independently substituted by —O—, —CH=CH—, —CH=CF—, or —CF=CF—, MG1 and MG2 are each independently a mesogenic group, X is a straight-chain or branched alkyl group with 3 to 40 C atoms wherein one or more non-adjacent —CH2- groups may be independently substituted by —O—, —CH(F)—, —CH(Cl)—, —CH=CH—, however in such a way that no two O-atoms are adjacent to one another, no two double bonds (—CH—CH—) are adjacent to each other;

and wherein the bimesogenic compound is in an amount from 10% to 50% by weight based on the liquid crystal composition.

6. The liquid crystal light modulating device of claim 4, wherein the bend elastic constant K33 of the liquid crystal composition is substantially the same as its twist elastic constant K22.

7. The liquid crystal light modulating device of claim 1, wherein the dichroic dyes may be dissolved in the liquid crystal composition, form a partial order arrangement with an order parameter between 0.1 to 1 to follow the liquid crystal molecules, and the dichroic dyes are in an amount from 0.01% wt to 5% wt of the liquid crystal composition.

8. The liquid crystal light modulating device of claim 7, wherein the dichroic dyes have single component, and an absorption peak in any waveband between 300 nm and 2500 nm.

9. The liquid crystal light modulating device of claim 1, wherein at least one of the first and second transparent conductive layer comprises at least one of independently electrically addressable region.

10. The liquid crystal light modulating device of claim 1, wherein the liquid crystal light modulating device further comprises a first and/or second alignment layers on one side of the first and/or second transparent conductive substrates adjacent to the liquid crystal layer.

11. The liquid crystal light modulating device of claim 1, further comprising spacers positioned between the first and second transparent conductive substrates, wherein the spacer material is selected from at least one of resin, glass fiber, and inorganic material, and the shape of the spacer material comprises ball, rod-like, or mixture shape.

12. The liquid crystal light modulating device of claim 1, wherein the liquid crystal light modulating device may realize at least three states including a transparent state with low haze, a transmissive state, and a light absorbing and scattering state with high haze, for visible light and near-infrared light incident thereon.

13. The liquid crystal light modulating device of claim 12, wherein the transparent state with low haze is obtained by continuously applying the first voltage between the first transparent conductive layer and the second transparent conductive layer, the transmissive state is obtained by applying a second voltage between the first transparent conductive layer and the second transparent conductive layer, and the light absorbing and scattering state with high haze is obtained by applying the third voltage between the first transparent conductive layer and the second transparent conductive layer.

14. The liquid crystal light modulating device of claim 13, wherein the first voltage is a continuous alternating current voltage, the second and third voltages are pulse voltages.

15. A laminated liquid crystal light modulating device, comprising a first substrate, a first adhesive layer, a liquid crystal light modulating device, a second adhesive layer, and a second substrate, laminated in sequence, wherein the liquid crystal light modulating device is the liquid crystal light modulating device of claim 1.

16. The insulated liquid crystal light modulating device, comprising a first substrate, a liquid crystal light modulating device, and a second substrate, positioned in sequency, further comprising a insulating cavity positioned between the first substrate and the liquid crystal device and/or between the liquid crystal device and second substrate, and the liquid crystal device is the one as in claim 1.

17. The liquid crystal light modulating device of claim 1, wherein the bend elastic constant K33 of the liquid crystal composition is substantially the same as its twist elastic constant K22.

* * * * *